United States Patent

[11] 3,590,536

| [72] | Inventor | Robert C. Fisher<br>Milford, Ohio |
|---|---|---|
| [21] | Appl. No. | 793,396 |
| [22] | Filed | Jan. 23, 1969 |
| [45] | Patented | July 6, 1971 |
| [73] | Assignee | Cincinnati Milacron Inc.<br>Cincinnati, Ohio |

[54] FOOTSTOCK FOR A MACHINE TOOL
9 Claims, 12 Drawing Figs.

| [52] | U.S. Cl. | 51/236, 82/31 |
|---|---|---|
| [51] | Int. Cl. | B24b 5/02, B23b 23/02 |
| [50] | Field of Search | 82/31; 51/236 |

[56] References Cited
UNITED STATES PATENTS

| 2,930,168 | 3/1960 | Luebkemann | 82/31 X |

FOREIGN PATENTS

| 544,194 | 4/1942 | Great Britain | 82/31 |

*Primary Examiner*—Harold D. Whitehead
*Attorney*—Pearce and Schaeperklaus

ABSTRACT: A footstock for a machine tool having housing with a lengthwise opening therein. A spindle is mounted in said opening. First spindle-supporting means is mounted in the opening adjacent a center carrying end of the spindle and engaging the side of the spindle opposed to the load on the center. Second spindle-supporting means is mounted in the opening engaging the side of the spindle on which the center is loaded. The spindle-supporting means are advanceable transversely of the axis of the spindle for aligning the spindle and center.

PATENTED JUL 6 1971

INVENTOR.
ROBERT C. FISHER
BY Pearce Schaeperklaus
Attorneys

INVENTOR.
ROBERT C. FISHER
BY *Pearce ↀ Schaeperklaus*

Attorneys

FOOTSTOCK FOR A MACHINE TOOL

This invention relates to the construction of a footstock for a machine tool such as a grinding machine or the like.

In the footstock for such a machine tool, a center is carried by a spindle which is mounted inside a housing that can be mounted on a bed of the machine tool. The spindle is mounted for moving axially inside the housing. Ordinarily, the spindle is mounted in a bore inside the housing, and faces of the spindle and of the bore must be accurately machined to insure proper positioning of the spindle. Further, it is difficult to adjust such a footstock in the event of wear of the spindle or of the bore of the housing and maintain the original accuracy of the fit.

An object of this invention is to provide a mounting arrangement for a spindle of a footstock which permits adjustments of the spindle transversely of the axis of the spindle for proper positioning of the spindle and to accommodate wear of the spindle and wear between the footstock and the table.

Briefly, this invention provides a footstock which includes a housing having a lengthwise opening in which a spindle is mounted. The spindle is supported by pillow or bearing blocks carried by radially adjustable members mounted in the housing. One end of the spindle carries the center, and pillow blocks adjacent that end of the spindle are disposed on the side of the axis opposite to that on which the grinding wheel of the tool is mounted and below the axis. Adjacent the opposite end of the spindle, additional pillow blocks are mounted which are on the same side of the axis as the grinding wheel and above the axis to supply force to the spindle to steady it. Springs are provided in association with the pillow blocks for holding the spindle in engagement with the pillow blocks.

The above and other objects and features of the invention will be apparent to those skilled in the art to which this invention pertains from the following detailed description and the drawings, in which.

In the following detailed description and the drawings, like reference characters indicate like parts.

Figure 1:
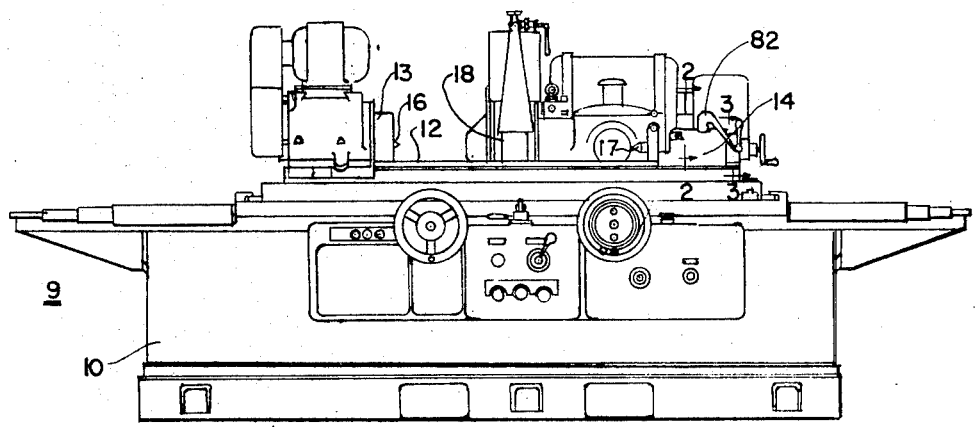
FIG. 1 is a view in front elevation of a grinding machine having a footstock constructed in accordance with an embodiment of this invention.

In FIG. 1 is shown a grinding machine 9 which includes a base 10 carrying a table 12 on which is mounted a headstock 13 and a footstock 14. The footstock 14 is constructed in accordance with an embodiment of this invention. The headstock 13 and the footstock 14 support centers 16 and 17, respectively, between which a workpiece, not shown, can be mounted for machining by a grinding wheel 18.

The footstock 14 includes a housing 19 having a lengthwise opening 20 (FIGS. 2 and 3) in which a spindle 21 having a cylindrical outer face 21' is mounted, the diameter of the spindle 21 being less than the diameter of the lengthwise opening 20. The center 17 is mounted in an axial tapered bore 22 (FIG. 2) in the spindle 21. Downwardly extending legs 23 and 24 of the housing 19 have sloping lower faces 25 and 26, respectively, which rest on upwardly directed sloping faces 27 and 28, respectively, of the table 12. A flange 31 on the leg 24 extends outwardly of the table 12 to hold the footstock 14 on the table.

Figure 2:
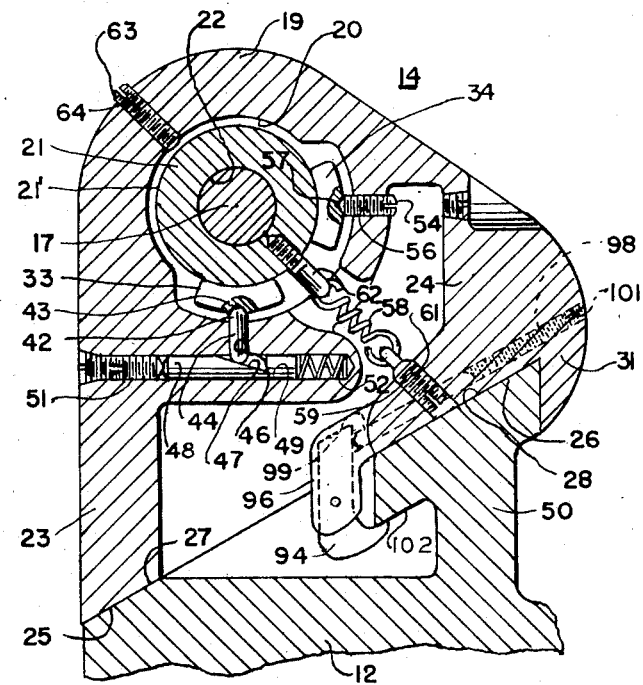
FIG. 2 is a view in section taken on an enlarged scale on the line 2-2 in FIG. 1.

The spindle 21 is guided and supported by a pair of pillow blocks 33 and 34 (FIG. 2) adjacent the center carrying end of the spindle and a second pair of pillow blocks 36 and 37 (FIG. 3) adjacent the end of the spindle remote from the center carrying end. Details of construction of the pillow block 33 are shown in FIG. 4, the other pillow blocks being similar in construction. The pillow block 33 is of generally arc shape with an inner face 39 thereof being complementary to the outer face 21' of the spindle. The outer face 41 of the pillow block 33 is provided with a centrally located generally conic socket 42. The socket 42 receives a half-spherical end portion 43 of a support pin 44 (FIG. 2). The pin 44 slides vertically in an upright bore 46 in the housing 19 underlying and extending substantially radially of the opening 20 and of the spindle 21. The lower end of the pin 44 rides on a wedge face 47 of a wedge rod 48. The wedge rod 48 slides transversely of the axis of the spindle 21 in a horizontal bore 49. A setscrew 51 threaded in the bore 49 can be turned to advance the wedge rod 48 to the right as shown in FIG. 2. A compression spring 52 mounted in the bore 49 urges the wedge rod 48 to the left.

The pillow block 34 is mounted on a screw 54. The screw 54 is threaded in a horizontal bore 56 which extends substantially radially of the opening 20 and of the spindle 21. A half-spherical head 57 of the screw 54 is received in the socket of the pillow block 34. Turning of the screw 54 advances the pillow block 34 to the left or right as shown in FIG. 2.

The spindle 21 is held in engagement with the pillow blocks 33 and 34 by a tension spring 58. One end of the spring 58 is held by a plug 59 mounted in a bore 61 in the housing and threaded therein. The other end of the spring 58 is held by an eyebolt 62 mounted in the spindle 21 and between the blocks 33 and 34. A safety screw 63 is mounted in a radial bore 64 opposite the pillow blocks 33 and 34 to prevent substantial raising of the spindle from the pillow blocks.

The pillow blocks 33 and 34 support the main load on the center 17, the block 33 reacting against gravitational load and downward load on the workpiece by the grinding wheel, the block 34 reacting against horizontal loading of the workpiece caused by the grinding wheel.

Figure 3:
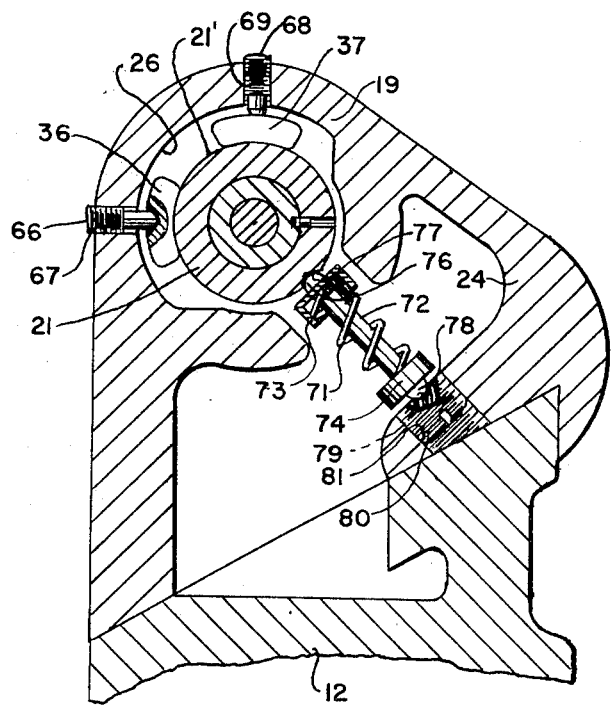
FIG. 3 is a view in section taken on the line 3-3 in FIG. 1 on an enlarged scale.
Figure 4:
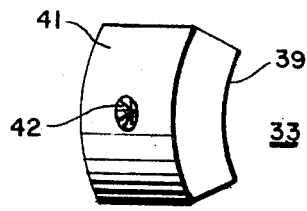
FIG. 4 is a perspective view of a pillow block forming a portion of the footstock.

The end of the spindle 21 remote from the center carrying end is steadied by the pillow blocks 36 and 37 as shown in FIG. 3. The pillow block 36 is carried by an adjustment screw 66 mounted in a horizontal radial bore 67. The pillow block 37 is actuated by an adjustment screw 68 mounted in a vertical radial bore 69. Hemispherical heads on the adjustment screws 66 and 68 are received in the sockets of the pillow blocks 36 and 37. The spindle 21 shield in engagement with the pillow blocks 36 and 37 by a compression spring 71. The spring 71 is mounted on a rod 72 which prevents collapse of the spring. Caps 73 and 74 mounted on opposite ends of the spring 71 are urged apart thereby. A hemispherical lug 76 on the cap 73 is received in a conic socket 77 in the spindle 21. A hemispherical lug 78 mounted on the cap 74 is received in a conic socket 79 in an adjustment plug 80 mounted in a radial bore 81 in the leg 24. The pillow block 37 holds the spindle 21 down while the pillow block 36 prevents displacement of the spindle horizontally.

Figure 5:
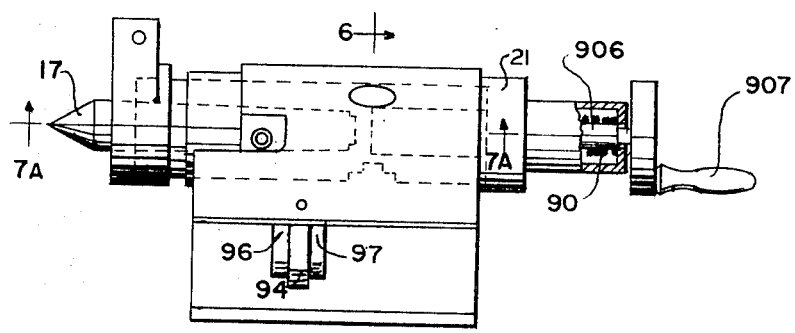
FIG. 5 is a view in side elevation of the footstock removed from the grinding machine.
Figure 6:
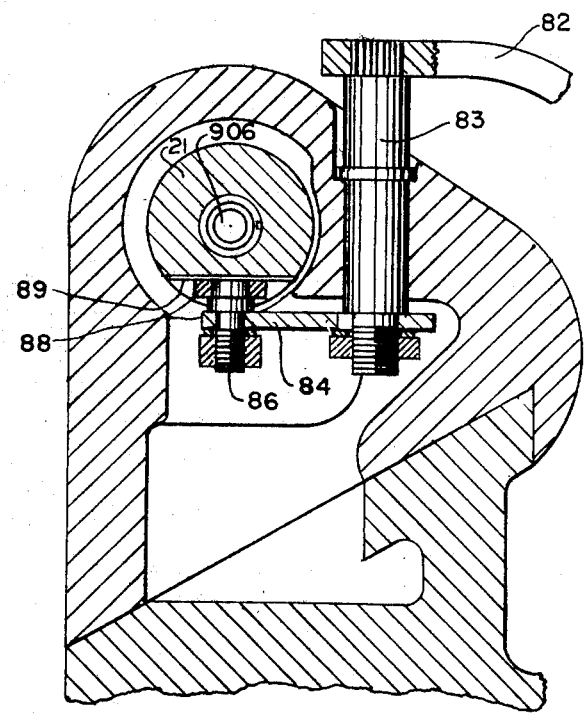
FIG. 6 is a view in section taken on the line 6-6 in FIG. 5.
Figure 7A:
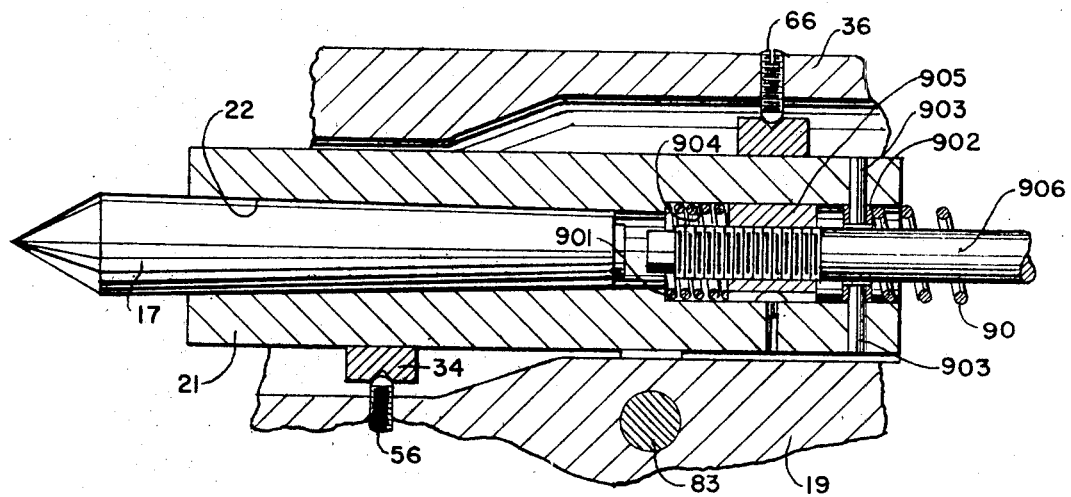
FIG. 7A is a view in section taken on an enlarged scale on the line 7A-7A in FIG. 5.
Figure 7:
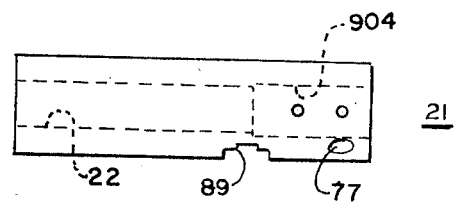
FIG. 7 is a view in side elevation of a spindle forming a part of the footstock.

The spindle 21 and the center 17 can be advanced to the right as shown in FIG. 5 by means of a handle 82 (FIGS. 1 and 6) which is attached to an upright shaft 83 (FIG. 6). The shaft carries a crank 84. The crank 84 carries a stud 86 on which is mounted a sliding shoe 88. The sliding shoe 88 slides transversely of the spindle 21 in a slot 89 FIGS. 6 and 7). Turning of the handle 82 advances the spindle and the center 17 in a direction to release the workpiece. Appropriate compression springs 90 and 901 FIGS. 5 and 7A) are mounted in the footstock and urge the spindle 21 and the center 17 in workpiece engaging direction. An appropriate stop (not shown) can be provided to limit advance of the spindle in that direction when no workpiece is engaged thereby. The spring 90 engages a ring 902 (FIG. 7A) mounted inside the spindle 21 and held therein by pins 903. The ring 902 is mounted inside an axial bore 904 inside the spindle, which communicates with the tapered bore 22. A nut 905 keyed inside the spindle 21 inside the bore 904 and movable therealong is threaded on shaft 906 which can be turned by a handle 907 (FIG. 5) to adjust the pressure of the spring 901. The housing 19 of the footstock can be held in selected position on the table 12 by a clamp 94 FIGS. 2 and 5) which is pivotally mounted between arms 96 and 97 (FIG. 5) and is actuated by a screw 98 (FIG. 2) and a pin 99 mounted in a bore 101 in the housing to engage the underside of a flange 102 of the table 12.

The adjustment screws 51, 54, 66, and 68 make it possible to adjust the axis of the spindle so that the footstock spindle is aligned with the headstock and corrections can be made for any wear of the spindle or of the pillow blocks. The pillow blocks can swing in any direction as required as the pillow blocks are advanced inwardly and outwardly with inner faces of the pillow blocks remaining in flatwise face-to-face engagement with the cylindrical face 21' of the spindle.

Figure 9:
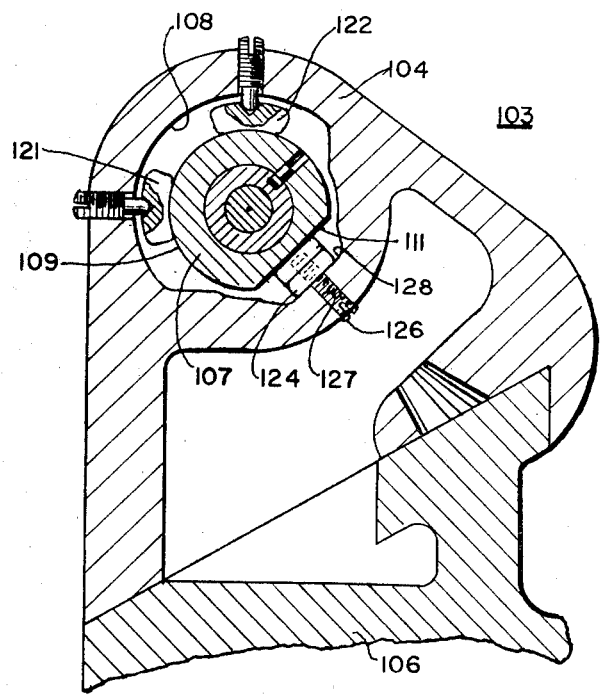
FIG. 9 is a view in section similar to FIG. 3 but showing the footstock illustrated in FIG. 8.
Figure 11:
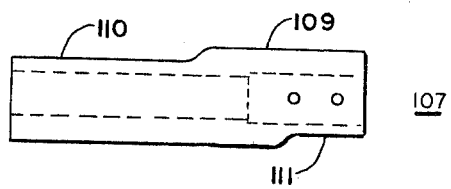
FIG. 11 is a view in side elevation of a spindle forming a part of the footstock shown in FIGS. 8 and 9.
Figure 8:
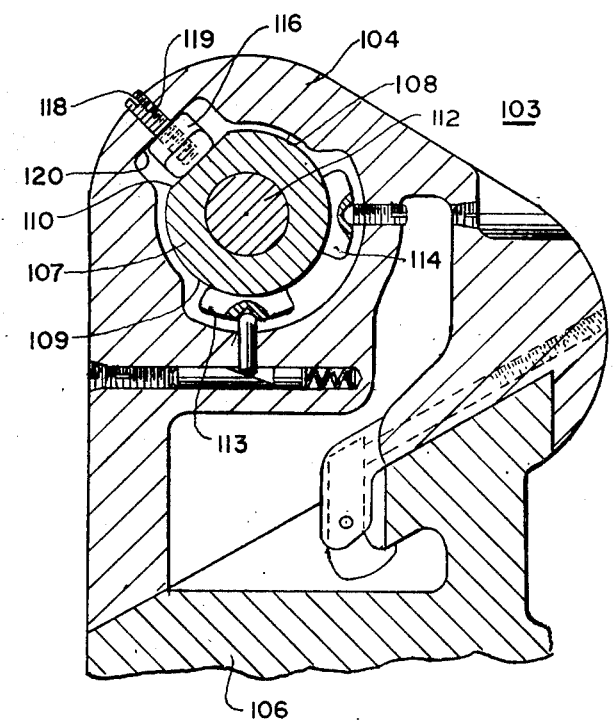
FIG. 8 is a view in section similar to FIG. 2 but showing a modified form of footstock.

In FIGS. 8 and 9 is shown a footstock 103 constructed in accordance with another embodiment of this invention. The footstock 103 includes a housing 104 mounted on a table 106. A spindle 107 is mounted in a lengthwise opening 108 therein. As shown in FIG. 11, the spindle 107 has a generally cylindrical outer face 109 broken by flat surfaces 110 and 111 which are parallel to the axis of the spindle and on opposite sides thereof.

Figure 10:
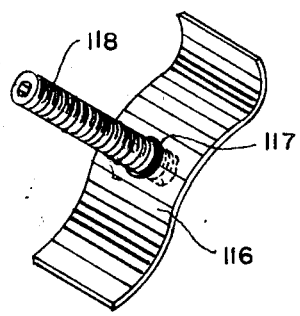
FIG. 10 is a perspective view of a spring and spring aligning screw of the device shown in FIGS. 7 and 8.

As shown in FIG. 8, support for the end portion of the spindle which carries a center 112 is supplied by pillow blocks 113 and 114 mounted in a manner similar to the mounting of like members of the footstock described earlier, the pillow blocks 113 and 114 engaging the cylindrical surface 109 of the spindle 103. The spindle is held in engagement with the pillow blocks 113 and 114 by a leaf spring 116. As shown in FIG. 10, the spring 116 is provided with a central opening 117 through which an end portion of a spring locating and safety screw 118 extends. The screw 118 is threaded in a radial opening 119 in the housing. The spring 116 engages the flat surface 109 of the spindle and a flat face 120 of the inside of the opening 108 to urge the spindle against the pillow blocks 113 and 114, and the inner end of the screw 118 can be positioned close to the surface 109 to prevent inadvertent substantial movement of the spindle away from the pillow blocks 113 and 114.

As shown in FIG. 9, the opposite end portion of the spindle 107 is steadied by pillow blocks 121 and 122, which are mounted in a manner similar to the manner of mounting like members of the footstock described earlier, the pillow blocks engaging the cylindrical face 109 of the spindle. The spindle is held in engagement with the pillow blocks 121 and 122 by a leaf spring 124, which is similar in construction to the leaf spring already described. A spring locating and safety screw 126 threaded in a radial bore 127 holds the spring 124 in position in engagement with the flat surface 111 and with a flat surface 128 on the interior of the opening 108 to urge the spindle into engagement with the pillow blocks 121 and 122. The inner end of the screw 126 can be disposed close to the face 111 to prevent inadvertent substantial shifting of the spindle 107 from the pillow blocks 121 and 122. Other details of construction of the footstock 103 shown in FIGS. 8 and 9 can be similar to other features of the footstock described heretofore.

The footstock constructions illustrated in the drawings and described above are subject to structural modification without departing from the spirit and scope of the appended claims.

Having described my invention, what I claim as new and desire to secure by Letters Patent is:

1. A footstock for a machine tool which comprises a housing having a lengthwise opening therein, a spindle mounted in said opening, a center carried by said spindle at one end thereof, first pillow block means in said opening adjacent the center carrying end of the spindle and engaging the side of the spindle opposed to the load on the center, second pillow block means in the opening engaging the side of the spindle on which the center is loaded, means mounted in the housing and supporting each pillow block means for universal swinging, and means for advancing the pillow block means transversely of the axis of the spindle for aligning the spindle and center.

2. A footstock in accordance with claim 1 wherein there is means for resiliently urging the spindle into engagement with the pillow block means.

3. A footstock in accordance with claim 1 wherein there is means for advancing the spindle and the center axially and transversely of the pillow block means and there is means for resiliently urging the spindle into engagement with the pillow block means.

4. A footstock as in claim 1 wherein the first pillow block means includes a pair of pillow blocks, one of said pillow blocks underlying the spindle, the other of said pillow blocks engaging a side of the spindle, there being separate means for supporting and advancing each of said pillow blocks.

5. A footstock as in claim 4 wherein a tension spring is connected at one of its ends to the spindle between the pillow blocks and at its other end to the housing, the tension spring urging the spindle into engagement with the pillow blocks.

6. A footstock as in claim 1 wherein a leaf spring is mounted between the spindle and the wall of the opening opposed to the first pillow block means to urge the spindle into engagement with the first pillow block means.

7. A footstock as in claim 1 wherein the second pillow block means includes a pair of pillow blocks, one of said pillow blocks overlying the spindle, the other of said pillow blocks engaging a side of the spindle, there being separate means for supporting and advancing each of said pillow blocks.

8. A footstock as in claim 1 wherein each of the pillow block means includes a pair of pillow blocks, one of the pillow blocks of the first pillow block means underlying the spindle, one of the pillow blocks of the second pillow block means overlying the spindle, the other pillow block of each pair engaging a side of the spindle, there being separate means for supporting and advancing each of the pillow blocks.

9. A footstock as in claim 8 wherein there is spring means associated with each pillow block means resiliently urging the spindle into engagement with the pillow blocks thereof.